US011899352B2

(12) United States Patent
Dai et al.

(10) Patent No.: US 11,899,352 B2
(45) Date of Patent: Feb. 13, 2024

(54) WAVELENGTH CONVERSION ELEMENT AND PROJECTOR (71) Applicant: Coretronic Corporation, Hsin-Chu (TW)

(72) Inventors: Meng-Syuan Dai, Hsin-Chu (TW); Chih-Sheng Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/988,776

(22) Filed: Nov. 17, 2022

(65) Prior Publication Data

US 2023/0161236 A1    May 25, 2023

(30) Foreign Application Priority Data

Nov. 24, 2021 (CN) .......................... 202111400024.2

(51) Int. Cl.
G03B 21/20 (2006.01)
G02B 26/00 (2006.01)

(52) U.S. Cl.
CPC ......... *G03B 21/204* (2013.01); *G02B 26/008* (2013.01)

(58) Field of Classification Search
CPC ...... G03B 21/204; G03B 21/16; G03B 21/20; G02B 26/008; F21V 29/89
See application file for complete search history.

(56) References Cited

U.S. PATENT DOCUMENTS

| 10,634,901 B2* | 4/2020 | Wu | G02B 26/008 |
| 2020/0348585 A1* | 11/2020 | Hsieh | G03B 21/2066 |
| 2020/0355850 A1* | 11/2020 | Chang | G02B 1/118 |
| 2021/0405345 A1* | 12/2021 | Hsu | G03B 21/204 |
| 2022/0059733 A1* | 2/2022 | Chou | H01L 33/505 |
| 2022/0365411 A1* | 11/2022 | Tsai | G02B 26/008 |
| 2023/0103144 A1* | 3/2023 | Tsai | G03B 21/204 |
| | | | 362/195 |

FOREIGN PATENT DOCUMENTS

| CN | 107102504 | | 8/2017 | |
| CN | 214427727 U | * | 10/2021 | .......... G02B 26/008 |
| CN | 114077136 A | * | 2/2022 | .......... H01L 33/504 |
| DE | 102020103123 A1 | * | 8/2021 | .............. F16F 15/32 |
| TW | I260798 | | 8/2006 | |
| TW | 202115929 | | 4/2021 | |

OTHER PUBLICATIONS

English Translation of CN-114077136-A; Wavelength Conversion Element and Light Source Module; Chou (Year: 2022).*

* cited by examiner

*Primary Examiner* — Zheng Song
*Assistant Examiner* — Glenn Zimmerman
(74) *Attorney, Agent, or Firm* — JCIPRNET (57) ABSTRACT

A wavelength conversion element and a projector including the wavelength conversion element are provided, which have good heat dissipation performance. The wavelength conversion element includes a turntable, a wavelength conversion layer, and a porous structure. The turntable has a wavelength conversion region and a non-wavelength conversion region, and includes a central axis. The wavelength conversion layer is disposed in the wavelength conversion region of the turntable. The porous structure is disposed in the non-wavelength conversion region of the turntable, and a material of the porous structure includes foamed metal.

20 Claims, 9 Drawing Sheets

WAVELENGTH CONVERSION ELEMENT AND PROJECTOR

CROSS-REFERENCE TO RELATED APPLICATION

This application claims the priority benefit of China application serial no. 202111400024.2, filed on Nov. 24, 2021. The entirety of the above-mentioned patent application is hereby incorporated by reference herein and made a part of this specification.

BACKGROUND

Technical Field

The disclosure relates to an optical element and a projector, and more particularly relates to a wavelength conversion element and a projector having the wavelength conversion element.

Description of Related Art

The function provided by a wavelength conversion element in a projection device is to convert a wavelength of light. With a wavelength conversion material coated on the surface of the wavelength conversion element, after an excitation beam irradiates the wavelength conversion material, the wavelength conversion material can be excited to emit light of different colors. However, the excitation beam generates a large amount of heat energy during the excitation process. If the heat energy cannot be effectively dissipated, the efficiency of wavelength conversion will decrease and the projection quality of the projection device will be affected.

The existing heat dissipation method is to generate an airflow field flowing through the surface of the wavelength conversion element through the rotation of the wavelength conversion element, and the heat dissipation is accelerated by the airflow field. However, the existing heat dissipation method still does not have ideal heat dissipation efficiency. Therefore, how to improve the heat dissipation efficiency of the wavelength conversion element is a research focus in the field.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a wavelength conversion element with good heat dissipation performance.

The disclosure provides a projector, whose wavelength conversion element has good heat dissipation performance.

Other objectives and advantages of the disclosure can be further understood from the technical features disclosed in the disclosure.

To achieve one or part or all of the above-mentioned objectives or other objectives, an embodiment of the disclosure provides a wavelength conversion element, including a turnable disc, a wavelength conversion layer, and a porous structure. The turnable disc has a wavelength conversion region and a non-wavelength conversion region, and includes a central axis. The wavelength conversion layer is disposed in the wavelength conversion region of the turnable disc. The porous structure is disposed in the non-wavelength conversion region of the turnable disc, and a material of the porous structure includes foamed metal.

To achieve one or part or all of the above-mentioned objectives or other objectives, an embodiment of the disclosure provides a projector, including a light source, a light valve, a projection lens, and a wavelength conversion element. The light source is adapted to provide an illumination beam. The light valve is adapted to receive the illumination beam from the light source and convert the illumination beam into an image beam. The projection lens is adapted to receive the image beam from the light valve and project the image beam out of the projector. The wavelength conversion element is configured in a transmission path of the illumination beam and includes a turnable disc, a wavelength conversion layer, and a porous structure. The turnable disc has a wavelength conversion region and a non-wavelength conversion region, and includes a central axis. The wavelength conversion layer is disposed in the wavelength conversion region of the turnable disc. The porous structure is disposed in the non-wavelength conversion region of the turnable disc, and a material of the porous structure includes foamed metal.

In an embodiment of the disclosure, the porosity of the above-mentioned porous structure is 85-99%.

In an embodiment of the disclosure, the material of the above-mentioned porous structure includes aluminum, nickel, copper or graphite.

In an embodiment of the disclosure, the thermal conductivity of the above-mentioned porous structure is greater than the thermal conductivity of the turnable disc, and the thermal conductivity of the porous structure is 80-400 W/mK.

In an embodiment of the disclosure, the above-mentioned turnable disc has a first surface and a second surface opposite to each other, a part of the first surface is the wavelength conversion region, and other parts of the first surface and the second surface are the non-wavelength conversion region. The porous structure is disposed on the second surface, and the orthographic projections of the porous structure and the wavelength conversion layer on the turnable disc along a direction parallel to the central axis completely overlap or partially overlap.

In an embodiment of the disclosure, the orthographic projection of the above-mentioned porous structure on the turnable disc along the direction parallel to the central axis is greater than the orthographic projection of the wavelength conversion layer on the turnable disc along the direction parallel to the central axis.

In an embodiment of the disclosure, the above-mentioned turnable disc has a first surface and a second surface opposite to each other, a part of the first surface is the wavelength conversion region, and other parts of the first surface and the second surface are the non-wavelength conversion region. The porous structure is disposed on the other parts of the first surface, and the orthographic projections of the porous structure and the wavelength conversion layer on the turnable disc along a direction parallel to the central axis do not overlap.

In an embodiment of the disclosure, the orthographic projection of the above-mentioned porous structure on the turnable disc along the direction parallel to the central axis has an annular shape or a circular shape.

In an embodiment of the disclosure, the above-mentioned turnable disc and the porous structure are integrally formed.

In an embodiment of the disclosure, the above-mentioned porous structure has at least one slot to form an airflow channel on the turnable disc.

Based on the aforementioned, embodiments of the disclosure at least have one of the following advantages or effects. In the disclosure, a porous structure made of foamed metal is arranged in the non-wavelength conversion region of the turnable disc of the wavelength conversion element. Thus, when the wavelength conversion element rotates, the airflow generated on the surface of the wavelength conversion element flows through the porous structure and then forms a disturbed airflow field, which helps to improve the heat dissipation efficiency. In addition, due to porous characteristics, the porous structure increases the heat dissipation area, and can also improve the heat dissipation efficiency of the wavelength conversion element.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
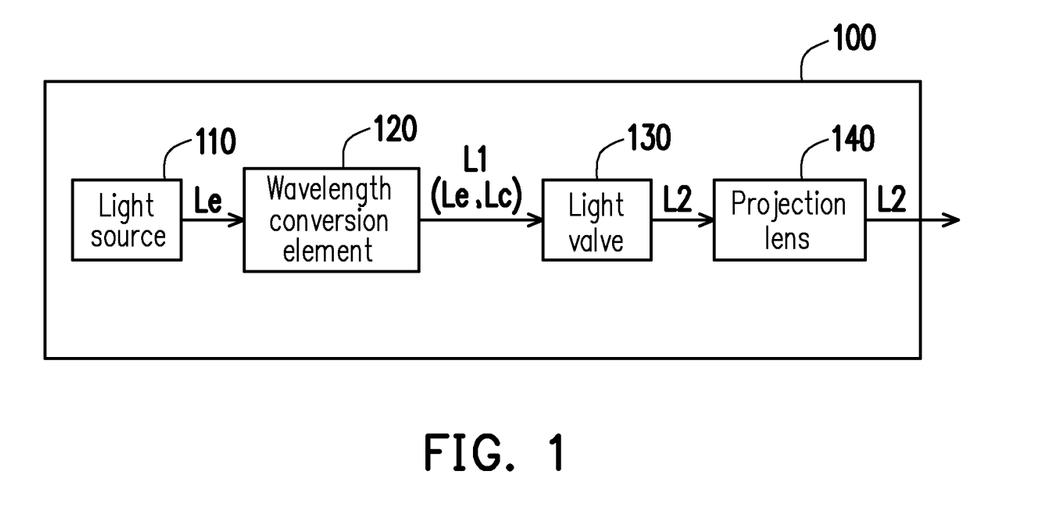
FIG. 1 is a schematic diagram of a projector according to an embodiment of the disclosure.

FIG. 1 is a schematic diagram of a projector according to an embodiment of the disclosure. Please refer to FIG. 1, a projector 100 of the embodiment includes a light source 110, a wavelength conversion element 120, a light valve 130 and a projection lens 140. The light source 110 provides an excitation beam Le, and the wavelength conversion element 120 is arranged in a transmission path of the excitation beam Le for converting the excitation beam Le into a conversion beam Lc of different wavelengths. An illumination beam L1 includes at least one of the excitation beam Le and the conversion beam Lc. The light valve 130 is disposed in a transmission path of the illumination beam L1 for converting the illumination beam L1 into an image beam L2. The projection lens 140 is disposed in a transmission path of the image beam L2 for receiving the image beam L2 from the light valve 130 and projecting the image beam L2 out of the projector 100.

Figure 2A:
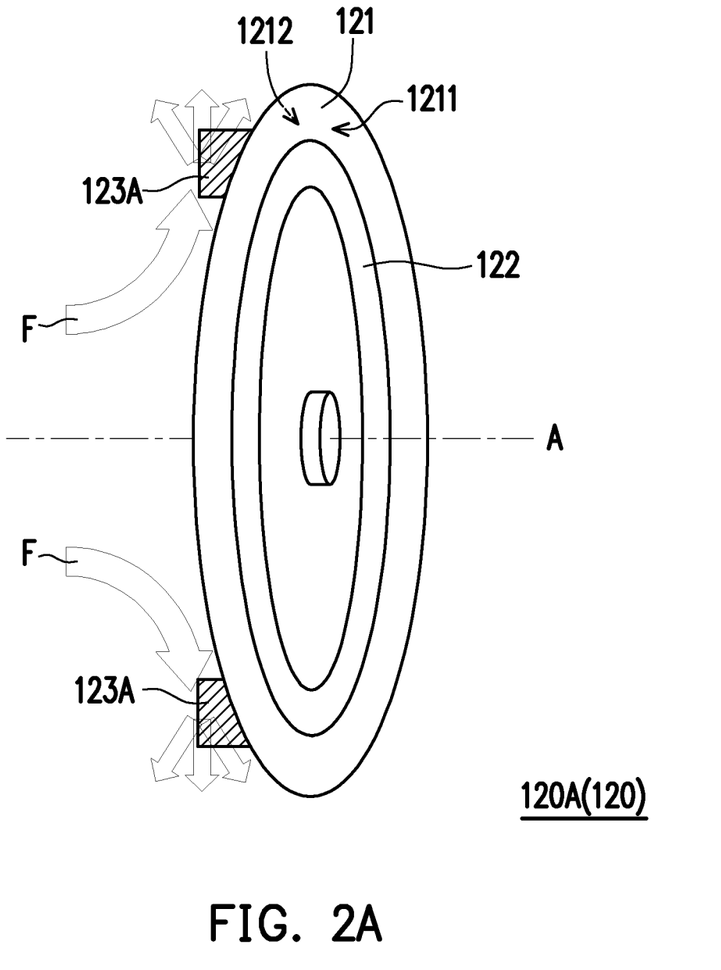
FIG. 2A is a schematic diagram of the wavelength conversion element shown in FIG. 1.
Figure 2B:
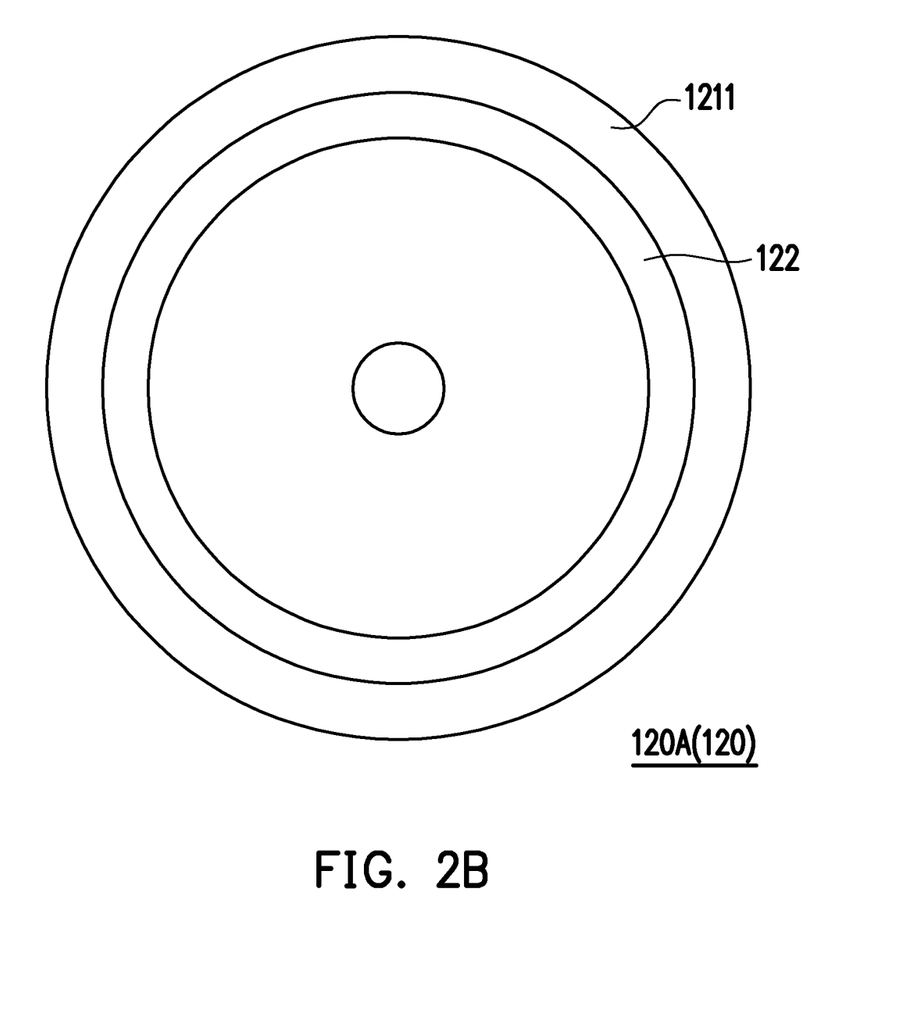
FIG. 2B is a front view of the wavelength conversion element shown in FIG. 2A.
Figure 2C:
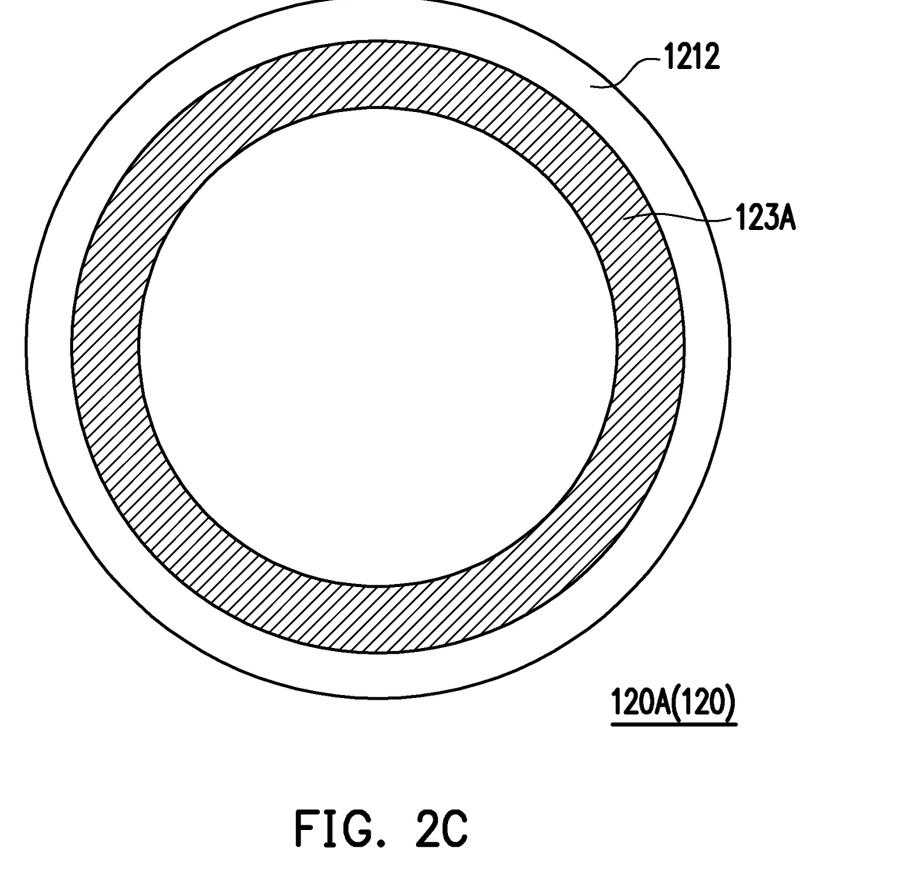
FIG. 2C is a rear view of the wavelength conversion element shown in FIG. 2A.
Figure 2D:
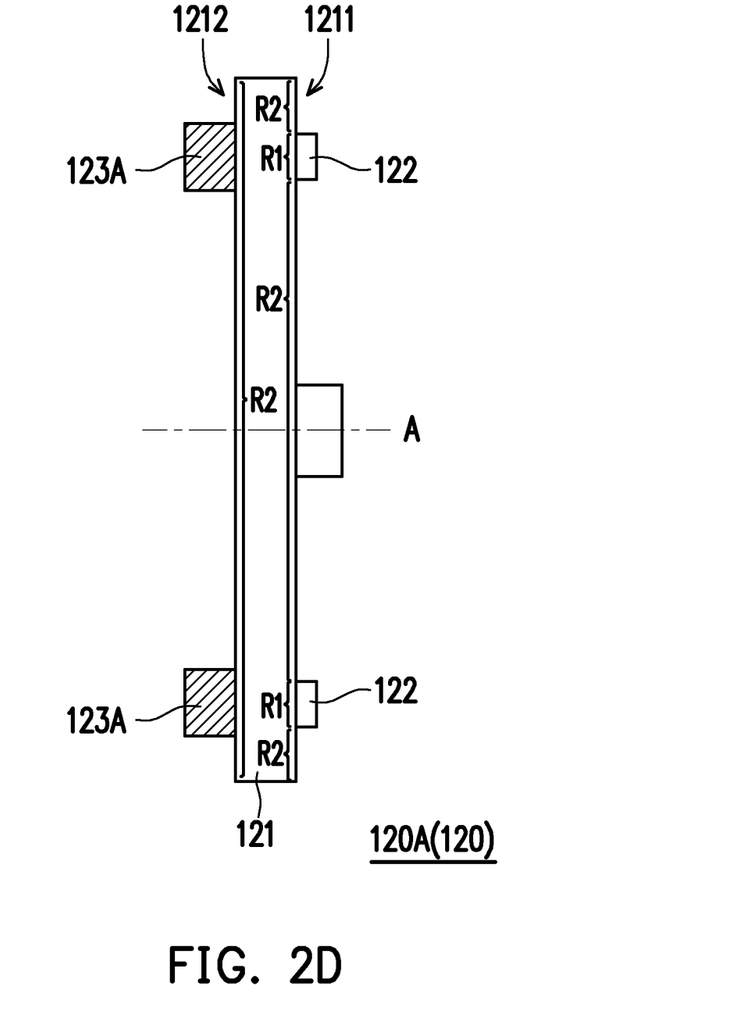
FIG. 2D is a side view of the wavelength conversion element shown in FIG. 2A.

FIG. 2A is a schematic diagram of the wavelength conversion element of FIG. 1, and FIG. 2B, FIG. 2C, and FIG. 2D are a front view, a rear view, and a side view of FIG. 2A, respectively. Please refer to FIG. 2A to FIG. 2D, a wavelength conversion element 120A (120) of the embodiment includes a turnable disc 121, a wavelength conversion layer 122, and a porous structure 123A. The turnable disc 121 has a wavelength conversion region R1 (marked in FIG. 2D) and a non-wavelength conversion region R2 (marked in FIG. 2D), and includes a central axis A. The wavelength conversion layer 122 is disposed in the wavelength conversion region R1 of the turnable disc 121 for receiving the excitation beam Le provided by the light source 110. The porous structure 123A is, for example, a foamed metal material, including graphite, aluminum, aluminum alloy, nickel, nickel alloy, and/or copper, and is disposed in the non-wavelength conversion region R2 of the turnable disc 121.

In this configuration, when the wavelength conversion element 120A rotates with the central axis A as the rotation axis, an airflow F generated on the surface of the wavelength conversion element 120 flows through the porous structure 123A to form a disturbed airflow field, which helps to improve heat dissipation efficiency. In addition, due to porous characteristics, the porous structure 123A increases the heat dissipation area of the turnable disc 121, and can also improve the heat dissipation efficiency of the wavelength conversion element 120.

In the embodiment, the porosity of the porous structure 123A is 85% to 99%, so as to increase the porosity and effectively form a disturbed flow field and increase the heat dissipation area as described above. In addition, the thermal conductivity of the porous structure 123A of the embodiment is 80-400 W/mK, that is, the thermal conductivity of the porous structure 123A is greater than the thermal conductivity of the turnable disc 121, so as to improve the heat dissipation efficiency of the wavelength conversion element 121.

In detail, the turnable disc 121 of the wavelength conversion element 120A of the embodiment has a first surface 1211 and a second surface 1212 opposite to each other, and the first surface 1211 of the turnable disc 121 is, for example, a light-receiving surface. Part of the first surface 1211 of the turnable disc 121 is a wavelength conversion region R1, and other parts of the first surface 1211 and the second surface 1212 of the turnable disc 121 are a non-wavelength conversion region R2. The porous structure 123A is disposed on the second surface 1212 of the turnable disc 121, and the orthographic projection of the porous structure 123A on the turnable disc 121 along a direction parallel to the central axis A is, for example, an annular shape. The orthographic projections of the porous structure 123A and the wavelength conversion layer 122 on the turnable disc 121 along the direction parallel to the central axis A at least partially overlap, so as to effectively dissipate the heat of the wavelength conversion layer 122. Specifically, the orthographic projection of the porous structure 123A on the turnable disc 121 along the direction parallel to the central axis A is, for example, greater than the orthographic projection of the wavelength conversion layer 122 on the turnable disc 121 along the direction parallel to the central axis A. In other embodiments, the orthographic projections of the porous structure 123A and the wavelength conversion layer 122 on the turnable disc 121 along the direction parallel to the central axis A may completely overlap, which is not limited in the disclosure.

In the embodiment, the porous structure 123A is disposed in the non-wavelength conversion region R2 on the turnable disc 121 by, for example, welding. However, the disclosure is not limited thereto. In other embodiments, the turnable disc 121 and the porous structure 123A may be integrally formed, and the materials of the turnable disc 121 and the porous structure 123A may both are foamed metal. Alternatively, the non-wavelength conversion region R2 of the turnable disc 121 and the porous structure 123A are integrally formed, and both are foamed metal. The wavelength conversion region R1 of the turnable disc 121 is made of a metal material with low porosity.

Figure 3A:
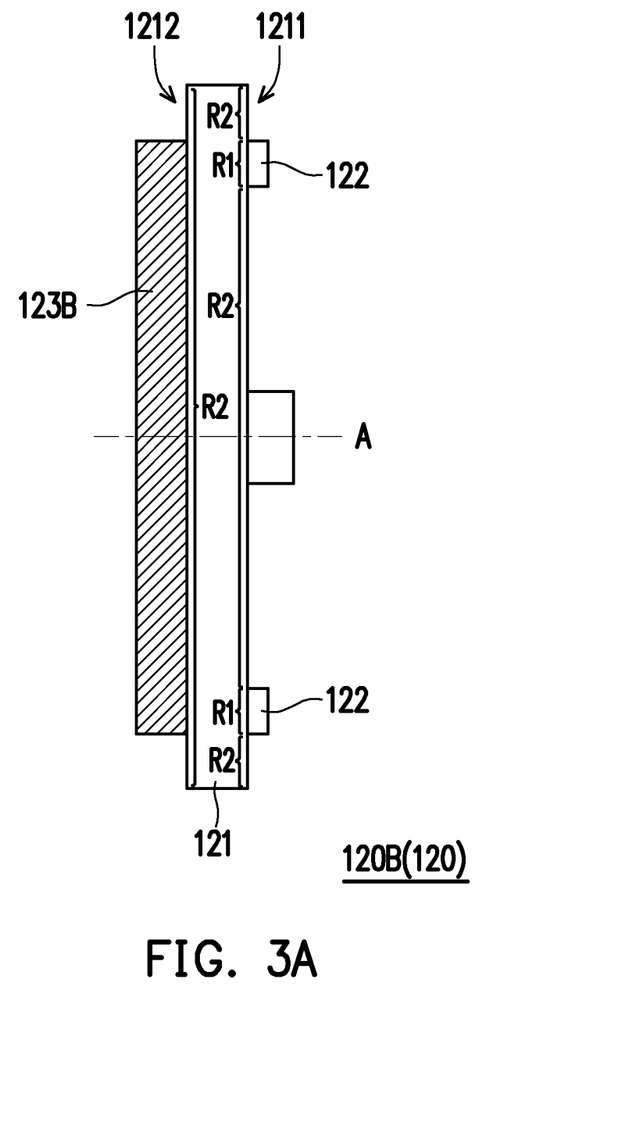
FIG. 3A is a side view of a wavelength conversion element according to another embodiment of the disclosure.
Figure 3B:
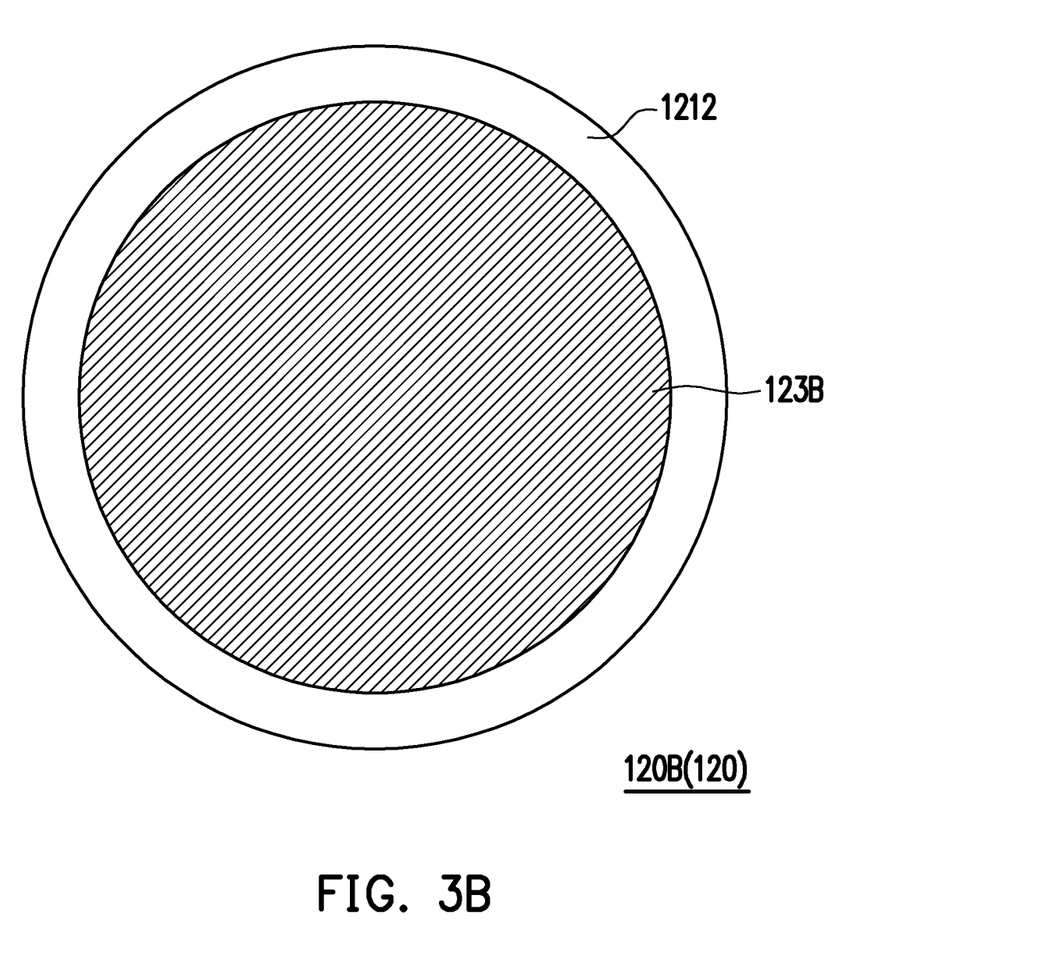
FIG. 3B is a rear view of the wavelength conversion element shown in FIG. 3A.

FIG. 3A is a side view of a wavelength conversion element according to another embodiment of the disclosure, and FIG. 3B is a rear view of the wavelength conversion element of FIG. 3A. Please refer to FIG. 3A to FIG. 3B. The wavelength conversion element 120B (120) of the embodiment is similar to the wavelength conversion element 120A of FIG. 2D. The difference between the two is that the orthographic projection of the porous structure 123A of the wavelength conversion element 120B on the turnable disc 121 along the direction parallel to the central axis A is a circular shape, which has a larger coverage area, that is, the porous structure 123B covers the central area on one side of the turnable disc 121, and the orthographic projection of the porous structure 123B on the turnable disc 121 along the direction parallel to the central axis A at least overlaps the orthographic projection of the wavelength conversion layer 122 on the turnable disc 121 along the direction parallel to the central axis A. Therefore, when flowing through the porous structure 123B, an airflow passes through more pores, which helps to disturb the airflow field and helps with the heat dissipation of the wavelength conversion element 120B.

Figure 4:
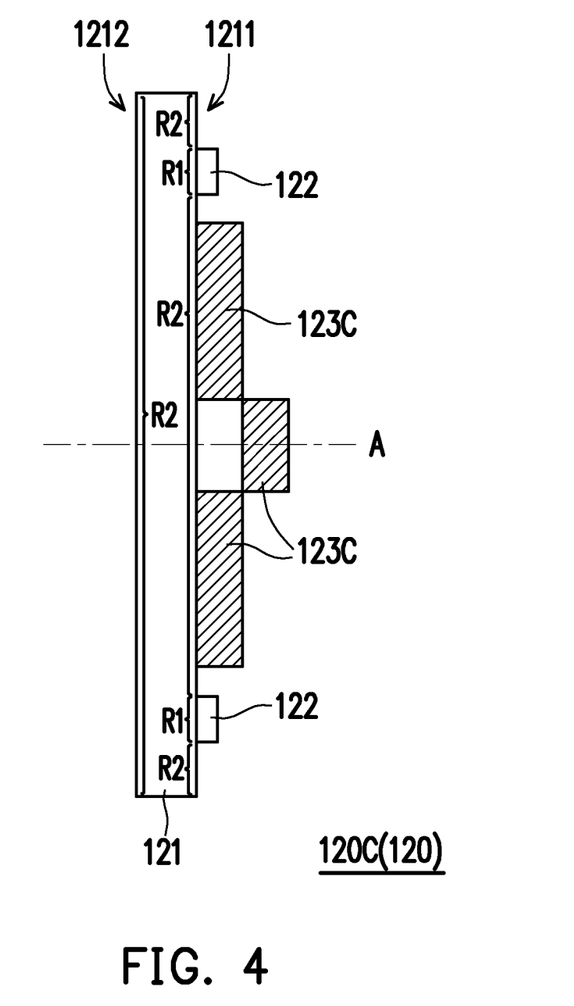
FIG. 4 is a side view of a wavelength conversion element according to another embodiment of the disclosure.

FIG. 4 is a side view of a wavelength conversion element according to another embodiment of the disclosure. Please refer to FIG. 4. The wavelength conversion element 120C (120) of the embodiment is similar to the wavelength conversion element 120A of FIG. 2D. The difference between the two is that the porous structure 123C of the wavelength conversion element 120C is disposed on the non-wavelength conversion region R2 of the first surface 1211 of the turnable disc 121. Therefore, the orthographic projections of the porous structure 123C and the wavelength conversion layer 122 on the turnable disc 121 along the direction parallel to the central axis A do not overlap, so as to avoid affecting the excitation of the excitation beam Le. In other embodiments, the porous structure 123C of the wavelength conversion element 120C (120) can, for example, replace a hub originally arranged on the rotation axis, that is, foamed metal (porous structure 123C) can be used as the hub.

Figure 5:
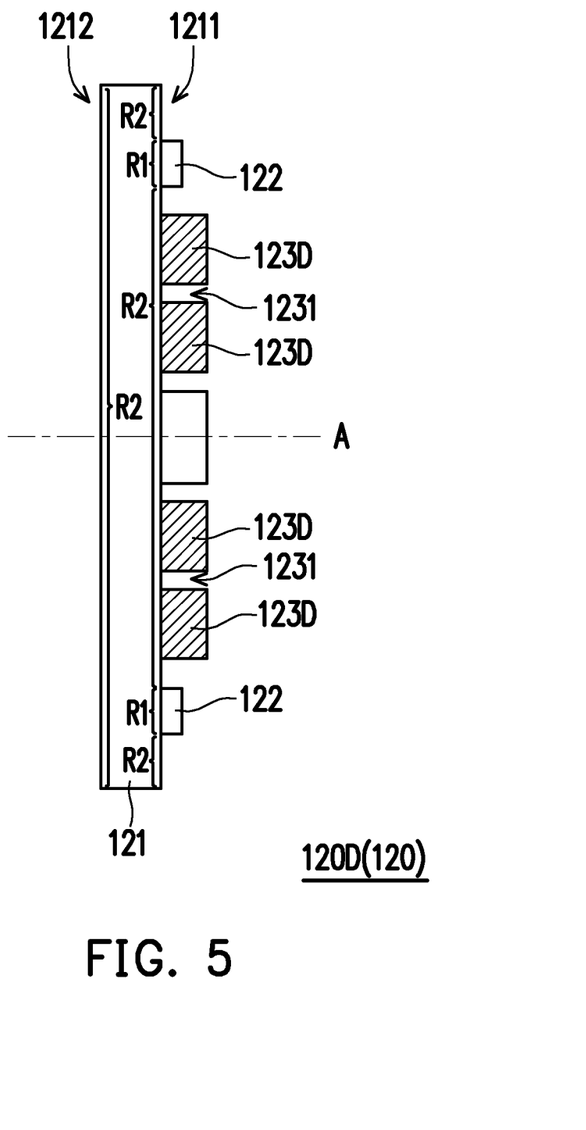
FIG. 5 is a side view of a wavelength conversion element according to another embodiment of the disclosure.

FIG. 5 is a side view of a wavelength conversion element according to another embodiment of the disclosure. Please refer to FIG. 5. The wavelength conversion element 120D (120) of the embodiment is similar to the wavelength conversion element 120C of FIG. 4. The difference between the two is that the porous structure 123D of the wavelength conversion element 120D also has at least one slot 1231, which forms an airflow channel on the turnable disc 121. When an airflow flows through the porous structure 123D, part of the airflow directly passes through the at least one slot 1231 (airflow channel) and part of the airflow passes through or disturbs the pores of the porous structure 123D, which expedites the heat dissipation of the wavelength conversion element 120D.

In summary, embodiments of the disclosure at least have one of the following advantages or effects. In the disclosure, the porous structure made of foamed metal is arranged in the non-wavelength conversion region of the turnable disc of the wavelength conversion element. Thus, when the wavelength conversion element rotates, the airflow generated on the surface of the wavelength conversion element flows through the porous structure and then forms the disturbed airflow field, which helps to improve the heat dissipation efficiency. In addition, due to porous characteristics, the porous structure increases the heat dissipation area, and can also improve the heat dissipation efficiency of the wavelength conversion element.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A wavelength conversion element, comprising: a turnable disc, a hub, a wavelength conversion layer, and a porous structure; wherein
   the turnable disc has a wavelength conversion region and a non-wavelength conversion region and comprises a central axis;
   the hub is arranged on the central axis, and a material of the hub comprises foamed metal;
   the wavelength conversion layer is disposed in the wavelength conversion region of the turnable disc; and
   the porous structure is disposed in the non-wavelength conversion region of the turnable disc, and a material of the porous structure comprises the foamed metal.

2. The wavelength conversion element according to claim 1, wherein a porosity of the porous structure is 85% to 99%.

3. The wavelength conversion element according to claim 1, wherein a material of the porous structure comprises aluminum, nickel, copper or graphite.

4. The wavelength conversion element according to claim 1, wherein a thermal conductivity of the porous structure is greater than a thermal conductivity of the turnable disc, and the thermal conductivity of the porous structure is 80-400 W/mK.

5. The wavelength conversion element according to claim 1, wherein the turnable disc has a first surface and a second surface opposite to each other, a part of the first surface is the wavelength conversion region and other parts of the first surface and the second surface are the non-wavelength conversion region, and the porous structure is disposed on the second surface, and orthographic projections of the porous structure and the wavelength conversion layer on the turnable disc along a direction parallel to the central axis at least partially overlap.

6. The wavelength conversion element according to claim 5, wherein the orthographic projection of the porous structure on the turnable disc along the direction parallel to the central axis is greater than the orthographic projection of the wavelength conversion layer on the turnable disc along the direction parallel to the central axis.

7. The wavelength conversion element according to claim 1, wherein the turnable disc has a first surface and a second surface opposite to each other, a part of the first surface is the wavelength conversion region and other parts of the first surface and the second surface are the non-wavelength conversion region, and the porous structure is disposed on the other parts of the first surface, and orthographic projections of the porous structure and the wavelength conversion layer on the turnable disc along a direction parallel to the central axis do not overlap.

8. The wavelength conversion element according to claim 1, wherein an orthographic projection of the porous structure on the turnable disc along a direction parallel to the central axis is an annular shape or a circular shape.

9. The wavelength conversion element according to claim 1, wherein the turnable disc and the porous structure are integrally formed.

10. The wavelength conversion element according to claim 1, wherein the porous structure has at least one slot to form an airflow channel on the turnable disc.

11. A projector, comprising: a light source, a light valve, a projection lens, and a wavelength conversion element; wherein
    the light source is adapted to provide an illumination beam;
    the light valve is adapted to receive the illumination beam from the light source and convert the illumination beam into an image beam;
    the projection lens is adapted to receive the image beam from the light valve and project the image beam out of the projector; and
    the wavelength conversion element is configured in a transmission path of the illumination beam and comprises: a turnable disc, a hub, a wavelength conversion layer, and a porous structure; wherein
       the turnable disc has a wavelength conversion region and a non-wavelength conversion region and comprises a central axis;
       the hub is arranged on the central axis, and a material of the hub comprises foamed metal;
       the wavelength conversion layer is disposed in the wavelength conversion region of the turnable disc; and
       the porous structure is disposed in the non-wavelength conversion region of the turnable disc, and a material of the porous structure comprises the foamed metal.

12. The projector according to claim 11, wherein a porosity of the porous structure is 85% to 99%.

13. The projector according to claim 11, wherein a material of the porous structure comprises aluminum, nickel, copper or graphite.

14. The projector according to claim 11, wherein a thermal conductivity of the porous structure is greater than a thermal conductivity of the turnable disc, and the thermal conductivity of the porous structure is 80-400 W/mK.

15. The projector according to claim 11, wherein the turnable disc has a first surface and a second surface opposite to each other, a part of the first surface is the wavelength conversion region and other parts of the first surface and the second surface are the non-wavelength conversion region, and the porous structure is disposed on at least a part of the second surface, and orthographic projections of the porous structure and the wavelength conversion layer on the turnable disc along a direction parallel to the central axis at least partially overlap.

16. The projector according to claim 15, wherein the orthographic projection of the porous structure on the turnable disc along the direction parallel to the central axis is greater than the orthographic projection of the wavelength conversion layer on the turnable disc along the direction parallel to the central axis.

17. The projector according to claim 11, wherein the turnable disc has a first surface and a second surface opposite to each other, a part of the first surface is the wavelength conversion region and other parts of the first surface and the second surface are the non-wavelength conversion region, and the porous structure is disposed on the first surface, and orthographic projections of the porous structure and the wavelength conversion layer on the turnable disc along a direction parallel to the central axis do not overlap.

18. The projector according to claim 11, wherein an orthographic projection of the porous structure on the turnable disc along a direction parallel to the central axis is an annular shape or a circular shape.

19. The projector according to claim 11, wherein the turnable disc and the porous structure are integrally formed.

20. The projector according to claim 11, wherein the porous structure has at least one slot to form an airflow channel on the turnable disc.

\* \* \* \* \*